(12) United States Patent
Takeda et al.

(10) Patent No.: US 8,576,460 B2
(45) Date of Patent: Nov. 5, 2013

(54) IMAGE READING DEVICE

(75) Inventors: Takashi Takeda, Nagano-ken (JP);
Satoshi Kinoshita, Nagano-ken (JP);
Hidemitsu Sorimachi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 50 days.

(21) Appl. No.: 13/353,683

(22) Filed: Jan. 19, 2012

(65) Prior Publication Data
US 2012/0188616 A1 Jul. 26, 2012

(30) Foreign Application Priority Data

Jan. 21, 2011 (JP) ................................. 2011-010748
Jan. 21, 2011 (JP) ................................. 2011-010749

(51) Int. Cl.
*H04N 1/04* (2006.01)

(52) U.S. Cl.
USPC ........... 358/475; 358/474; 358/509; 359/726; 362/247

(58) Field of Classification Search
USPC .......... 358/475, 474, 484, 509; 359/726, 627, 359/727; 362/555, 247, 307, 558
See application file for complete search history.

(56) References Cited

U.S. PATENT DOCUMENTS

| | | | |
|---|---|---|---|
| 5,768,023 A * | 6/1998 | Sawaki et al. | 359/622 |
| 5,953,133 A * | 9/1999 | Fujimiya et al. | 358/474 |
| 6,326,602 B1 * | 12/2001 | Tabata | 250/208.1 |
| 6,565,248 B2 * | 5/2003 | Honguh et al. | 362/560 |
| 6,767,122 B2 * | 7/2004 | Honguh et al. | 362/555 |
| 7,042,599 B2 * | 5/2006 | Yokota et al. | 358/475 |
| 7,262,801 B2 * | 8/2007 | Saika | 348/304 |
| 7,864,293 B2 * | 1/2011 | Kato et al. | 355/53 |
| 7,903,298 B2 * | 3/2011 | Sawada et al. | 358/484 |
| 8,059,355 B2 * | 11/2011 | Nayak et al. | 360/75 |
| 8,310,737 B2 * | 11/2012 | Nagao et al. | 358/475 |
| 8,339,682 B2 * | 12/2012 | Kawamura et al. | 358/474 |
| 8,358,450 B2 * | 1/2013 | Kim | 358/474 |
| 8,379,275 B2 * | 2/2013 | Tahk et al. | 358/475 |
| 8,422,093 B2 * | 4/2013 | Ishida | 358/475 |
| 8,422,095 B2 * | 4/2013 | Huang | 358/475 |
| 8,462,402 B2 * | 6/2013 | Kim | 358/475 |
| 8,477,385 B2 * | 7/2013 | Takahashi et al. | 358/474 |

FOREIGN PATENT DOCUMENTS

JP 2000-066134 A 3/2000

* cited by examiner

*Primary Examiner* — Negussie Worku

(57) ABSTRACT

An image reading device includes a light source; a light guiding member; an imaging optical system that reflects the light, which faces a first direction from the object, in a second direction intersecting the first direction by a reflective plane disposed in the first direction of the object, that makes the light, which is reflected by the reflective plane, converge toward the second direction by an emission portion disposed in the second direction of the reflective plane, and that images an erect equal-magnification image of the object in the second direction of the emission portion; and an optical sensor that is disposed in the second direction of the emission portion of the imaging optical system, and detects the erect equal-magnification image that is imaged by the imaging optical system, in which the light guiding member is disposed at an object side of the emission portion in the first direction.

20 Claims, 3 Drawing Sheets

IMAGE READING DEVICE

CROSS REFERENCES TO RELATED APPLICATIONS

The present invention contains subject matter related to Japanese Patent Application No. 2011-010748 filed in the Japanese Patent Office on Jan. 21, 2011, and Japanese Patent Application No. 2011-010749 filed in the Japanese Patent Office on Jan. 21, 2011, and the entire contents of which are incorporated herein by reference.

BACKGROUND

1. Technical Field

The present invention relates to an image reading device that reads an image of an object by guiding light from a light source via a light guiding member and irradiating the object with the light, and by detecting the light from the object.

2. Related Art

In image scanners, facsimiles, copy machines, banking terminal devices, or the like, a contact image sensor module (hereinafter, abbreviated as "CIS module") is used as an image reading device. This CIS module reads an image of an object to be read by irradiating the object to be read with light, and detecting the reflected light at this time with an optical sensor. In addition, an imaging optical system having an imaging magnification of an erect equal-magnification is generally used to appropriately guide the reflected light from the object to be read to the optical sensor. That is, this imaging optical system images the light reflected by the object to be read at an erect equal-magnification, and images the erect equal-magnification image of the object to be read toward the optical sensor. Then, the optical sensor is able to read the image of the object to be read by detecting the erect equal-magnification image imaged by the imaging optical system.

However, JP-A-2000-066134 discloses an imaging optical system that changes the direction of the optical axis (that folds the optical axis) by reflecting light using a roof prism, to achieve miniaturization of the CIS module. In this imaging optical system, an object-side lens is disposed to be opposite the object to be read, and an image-side lens that links the image of the object to be read to an image plane in cooperation with the object-side lens are provided. In addition, a roof prism is disposed in the light path from the object-side lens to the image-side lens. Therefore, the light, which is reflected by the object to be read and is transmitted through the object-side lens, is reflected by the roof prism lens and the propagation direction thereof is changed and is made to face toward the image-side lens. In this way, miniaturization of the CIS module may be achieved by using a reflection plane (roof prism) to change the propagation direction of the light.

However, the image reading device needs an illumination unit that irradiates an object with light. In JP-A-2000-066134, an illumination light source is provided as this illumination unit. However, in addition to the illumination light source disclosed in JP-A-2000-066134, to appropriately irradiate the object with light generated at the light source, it is also preferable to include a light guide that guides the light generated at the light source and irradiates the object with this light. However, when such a light guide is separately provided in addition to the light source, miniaturization of the image reading device may become difficult.

In addition, miniaturization of the image reading device may be difficult for the following reasons. That is, in the image reading device provided with the above-described optical sensor and the light source, it is necessary to provide substrates on which the optical sensor and the light source are mounted. However, when the substrate is provided with respect to each of the optical sensor and the light source, it may also be difficult to miniaturize the image reading device.

SUMMARY

An advantage of some aspects of the invention is to provide a technology capable of realizing miniaturization of the image reading device that guides light from a light source to an object by a light guiding member, and reads the light from the object by a light sensor.

According to an aspect of the invention, there is provided an image reading device including a light source; a light guiding member that guides light emitted from the light source and irradiates an object with the light; an imaging optical system that reflects the light, which faces a first direction from the object, in a second direction intersecting the first direction by a reflective plane disposed in the first direction of the object, that makes the light, which is reflected by the reflective plane, converge toward the second direction by an emission portion disposed in the second direction of the reflective plane, and that images an erect equal-magnification image of the object in the second direction of the emission portion; and an optical sensor that is disposed in the second direction of the emission portion of the imaging optical system, and detects the erect equal-magnification image that is imaged by the imaging optical system, in which the light guiding member is disposed at the object side of the emission portion in the first direction.

In the aspect (the image reading device) configured as described above, the reflective plane disposed in the first direction of the object reflects the light, which faces the first direction from the object, in the second direction intersecting the first direction. That is, the reflective plane disposed in the first direction of the object changes the direction of the light from the object from the first direction to the second direction. In addition, the emission portion is disposed in the second direction of the reflective plane, and this emission portion makes the light, which is reflected at the reflective plane, converge toward the second direction. In this way, in the configuration in which the light, which propagates from the object to the reflective plane in the first direction, is made to converge toward the second direction by the emission portion, it is possible to provide a space at an object side of the emission portion. Therefore, in this aspect of the invention, the light guiding member, which guides the light from the light source to the object, is disposed in this space. Therefore, it is possible to realize miniaturization of the image reading device regardless of the light guiding member provided in addition to the light source.

In addition, the light source may be disposed in the second direction of the light guiding member, and the optical sensor and the light source may be mounted on the same substrate that is disposed in the second direction of the imaging optical system and the light guiding member.

In this manner, the light guiding member is disposed in an empty space at the object side of the emission portion of the imaging optical system, in other words, the emission portion of the imaging optical system and the light guiding member are disposed in a line in the first direction. Furthermore, in this aspect of the invention, the miniaturization of the image reading device is realized by utilizing an advantage this disposition has as described below. That is, the imaging optical system images an erect equal-magnification image toward the optical sensor, and the light guiding member guides the light emitted from the light source. Therefore, it is necessary to dispose the optical sensor or the light source with respect to each of the imaging optical system and the light guiding member. Contrary to this, in the configuration in which the imaging optical system and the light guiding member are disposed in a line in the first direction, it is possible to collectively dispose both of the optical sensor and the light source in the second direction of the imaging optical system and the light guiding member. Therefore, in this aspect of the invention, the optical sensor and the light source are disposed in the second direction of the imaging optical system and the light guiding member. Furthermore, the substrate is disposed in the second direction of the imaging optical system and the light guiding member, and the optical sensor and the light source are mounted in the same substrate. As a result, it is possible to realize the miniaturization of the image reading device.

In addition, the imaging optical system may guide the light, which faces the first direction from the object, to the reflective plane by an incidence portion that is disposed at an object side of the reflective plane. In this configuration, there is an advantage in that it is possible to appropriately guide the light from the object to the reflective plane, and therefore it is possible to improve utilization efficiency of light.

At this time, more specifically, the incidence portion may include incidence lenses in a plane that is opposite to the object, and guides the light, which faces the first direction from the object, to the reflective plane by the incidence lenses, and the emission portion may include emission lenses at a plane that is opposite to the optical sensor, and makes the light reflected at the reflective plane converge toward the second direction by the emission lenses.

In addition, the imaging optical system may be configured in such a manner that the incidence portion extending in the first direction, the emission portion extending in the second direction, and a connection portion that connects the incidence portion and the emission portion are integrally formed of a transparent medium, and the connection portion facing from the incidence portion to the emission portion may have a shape that is bent from the first direction to the second direction, and the reflective plane may be provided at an outer peripheral plane of the connection portion that is bent from the first direction to the second direction. In this configuration, the incidence lenses of the incidence portion, the reflective plane of the connection portion, and the emission lenses of the emission portion are integrally formed of a transparent medium, such that air is not present between the incidence lenses, the reflective plane, and the emission lenses. Therefore, there is an advantage in that the light is not scattered at an interface with air, and it is possible to improve the utilization efficiency of the light.

In addition, the emission portion may include a plurality of lenses that is arranged in a line in the second direction, and the imaging optical system may make the light, which is reflected at the reflective plane, converge through the plurality of lenses and images the erect equal-magnification image.

In addition, the emission portion may include a refraction index distribution-type lens, and the imaging optical system makes the light, which is reflected at the reflective plane, converge by the refraction index distribution-type lens and images the erect equal-magnification image.

In addition, the second direction may be a direction that is orthogonal to the first direction.

BRIEF DESCRIPTION OF THE DRAWINGS

The invention will be described with reference to the accompanying drawings, wherein like numbers reference like elements.

FIG. 2 is a perspective view illustrating a lens array or the like.

DESCRIPTION OF EXEMPLARY EMBODIMENTS

First Embodiment

Figure 1:
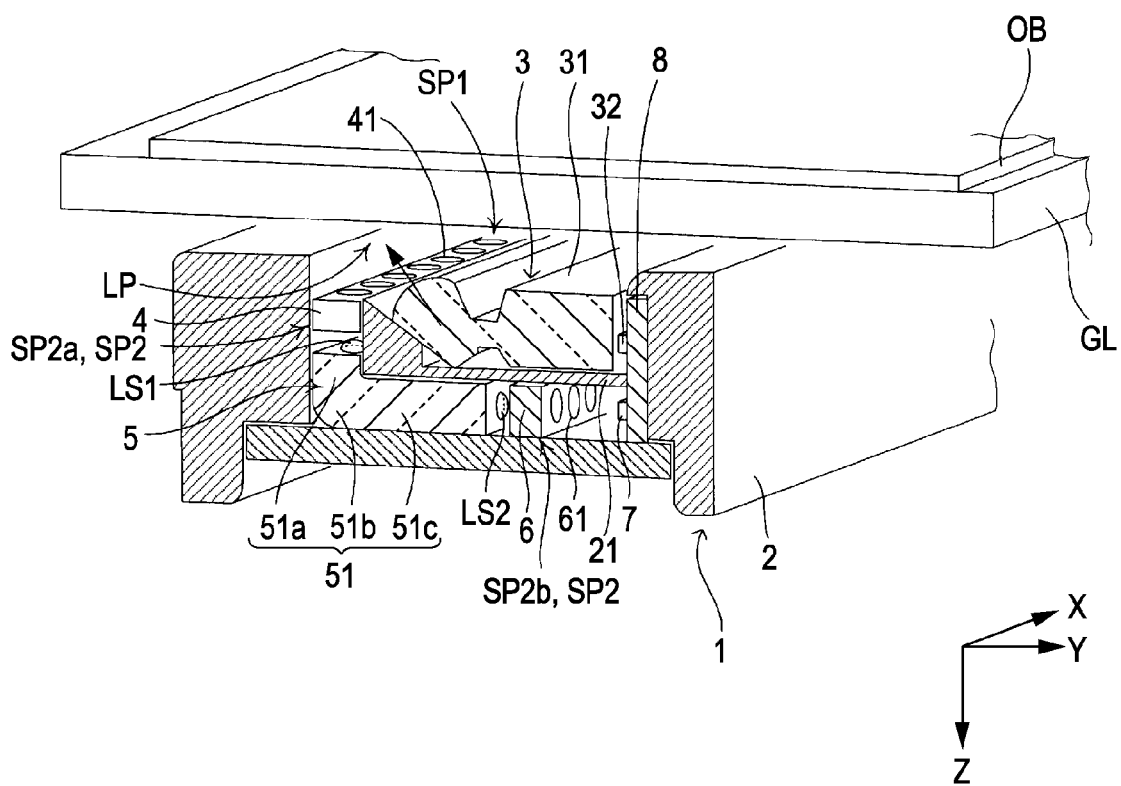
FIG. 1 is a partial cross-sectional perspective view illustrating a schematic configuration of an embodiment of an image reading device according to the invention.
Figure 2:
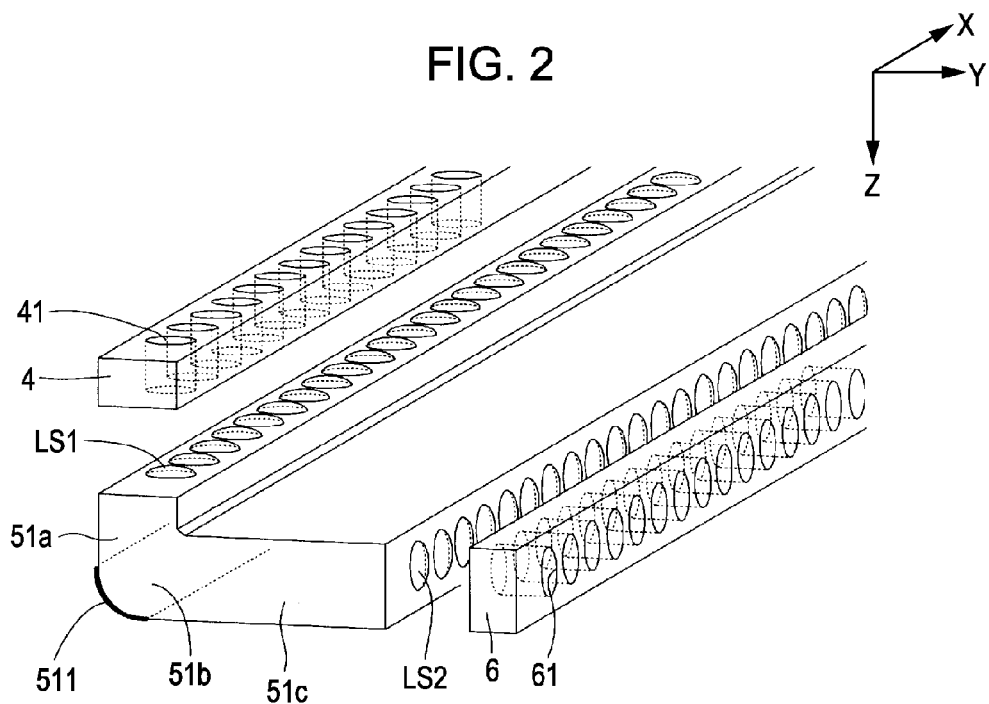

FIG. 1 shows a partial cross-sectional perspective view illustrating a schematic configuration of a CIS module that is an embodiment of an image reading device according to the invention. FIG. 2 shows a perspective view illustrating an incidence-side aperture member, a lens array, and an emission-side aperture member. In FIG. 1, FIG. 2, and in the following description, XYZ orthogonal coordinates are appropriately shown to illustrate a positional relationship of each member. In addition, arrow sides in the coordinate axes are set as positive sides, and opposite sides of the arrow sides in the coordinate axes are set as negative sides. Furthermore, in the following description, the negative side of the Z-direction is regarded as the upper side, the positive side of the Z-direction is regarded as the lower side, the negative side of the Y-direction is regarded as the left side, the positive side of the Y-direction is regarded as the right side, the negative side of the X-direction is regarded as a front side, and the positive side of the X-direction is regarded as the back side.

The CIS module 1 is a device that reads an image printed on a document OB in which the document OB placed on a document glass GL is set as an object to be read. The CIS module 1 is disposed immediately below the document glass GL. The CIS module 1 includes a frame 2 having a substantially rectangular parallelepiped shape that extends to an extent longer than a maximum reading range in the X-direction. In the frame 2, an illumination portion 3, an incidence-side aperture member 4, a lens array 5, an emission-side aperture member 6, an optical sensor 7, and a printed circuit substrate 8 are disposed.

In the frame 2, a first accommodation space SP1 that accommodates the illumination portion 3 illuminating the document OB, and a second accommodation space SP2 that accommodates each of the functional units 4, 5, 6, 7, and 8 for reading an image of the document OB are separated with a separator 21. The first accommodation space SP1 is provided at an upper position in the frame 2. On the other hand, the second accommodation space SP2 is provided so as to surround the first accommodation space SP1 from left side to lower side thereof in a cross-section (hereinafter, referred to as a "sub-scanning cross-section") including the YZ plane. More specifically, the second accommodation space SP2 includes a vertical space SP2a extending in the Z-direction (vertical direction) on the left side of the first accommodation space SP1, and a horizontal space SP2b extending from the lower end of the vertical space SP2a in the Y-direction (horizontal direction). In this manner, the second accommodation space SP2 is formed, which is bent at a right angle from the vertical space SP2a and extends to the horizontal space SP2b.

The illumination portion 3 includes a light guide 31 and a light source 32 accommodated inside the first accommodation space SP1. The light source 32 is an LED (Light Emitting Diode) disposed in the Y-direction (right direction) of the light guide 31, and emits illumination light toward the negative side (left direction) in the Y-direction. The illumination light emitted from the light source 32 is guided to one-side end face (negative-side end face in the X-direction) of the light guide 31 by a member (not shown), and is incident to the inside of the light guide 31 from the one-side end face. As shown in FIG. 1, the light guide 31 is provided on an upper surface of the separator 21 to extend in the X-direction by a length that is substantially equal to the maximum reading range. In addition, after being incident from the one-side end face, the illumination light is partially emitted from a front end (light emission plane) at each portion of the light guide 31 (refer to an arrow in FIG. 1) while propagating in the X-direction in the inside of the light guide 31. The light that is emitted toward an upper-left irradiation position LP from the light guide 31 (from the front end thereof) is emitted toward the document OB on the document glass GL. In this manner, the illumination light of a strip-shape extending in the X-direction is emitted to the document OB and is reflected by the document OB.

The above-described upper vertical space SP2a is provided immediately below the irradiation position LP at which the light guide 31 irradiates the document OB with the illumination light, and the incidence-side aperture member 4 is disposed at an upper end of the vertical space SP2a. The incidence side aperture member 4 is provided to extend in the X-direction by a length that is substantially equal to the maximum reading range. In the incidence side aperture member 4, a plurality of penetration holes 41 is arranged in a line in the X-direction at a predetermined pitch, and serves as an incidence-side aperture member with respect to a plurality of first lenses LS1 provided at the lens array 5, respectively.

The lens array 5 is provided to extend in the X-direction by a length that is substantially equal to the maximum reading range, and the entirety of the lens array 5 can be totally inserted in the second accommodation space SP2. The lens array 5 includes first lenses LS1 (incidence-side lenses) that are upwardly convex and are opposite to the document OB (irradiation position LP thereof), second lenses LS2 (emission-side lenses) that are convex toward the right side and are opposite the optical sensor 7 at a lower side or the right side of the first lenses LS1, and a light guiding portion 51 that connects the first and second lenses LS1 and LS2.

In the sub-scanning cross-section, the light guiding portion 51 includes an incidence portion 51a that extends in the Z-direction, a bent portion 51b that is bent from the lower end of the incidence portion 51a in the Y-direction, and an emission portion 51c that extends from the right end of the bent portion 51b in the Y-direction. In this manner, the light guiding portion 51 is bent at a right angle from the X-direction to the Y-direction at the bent portion 51b that extends from the incidence portion 51a to the emission portion 51c. On the upper surface of the incidence portion 51a of the light guiding portion 51, the plurality of first lenses LS1 is arranged in a line in the X-direction at a predetermined pitch in correspondence with a plurality of penetration holes 41 of the incidence-side aperture member 4 in a one-to-one relationship. In addition, on the right end face of the emission portion 51c of the light guiding portion 51, the plurality of second lenses LS2 is arranged in a line in the X-direction at a predetermined pitch in correspondence with the plurality of first lenses LS1 in a one-to-one relationship. In addition, the illumination light incident to the first lenses LS1 is guided to the second lenses LS2 by the light guiding portion 51.

In addition, a reflective film 511 that guides the incident light from the first lenses LS1 to the second lenses LS2 is provided to the light guiding portion 51. The reflective film 511 is a metallic film that is vapor-deposited on an outer peripheral surface of the bent portion 51b that is bent from the incidence portion 51a to the emission portion 51c of the light guiding portion 51. The reflective film 511 reflects the illumination light, which is incident from the first lenses LS1 in the Z-direction, in the Y-direction. In this manner, the light, which is reflected from the document OB at the irradiation position LP of the illumination light, propagates in the Z-direction and is incident to the first lenses LS1.

Figure 3:
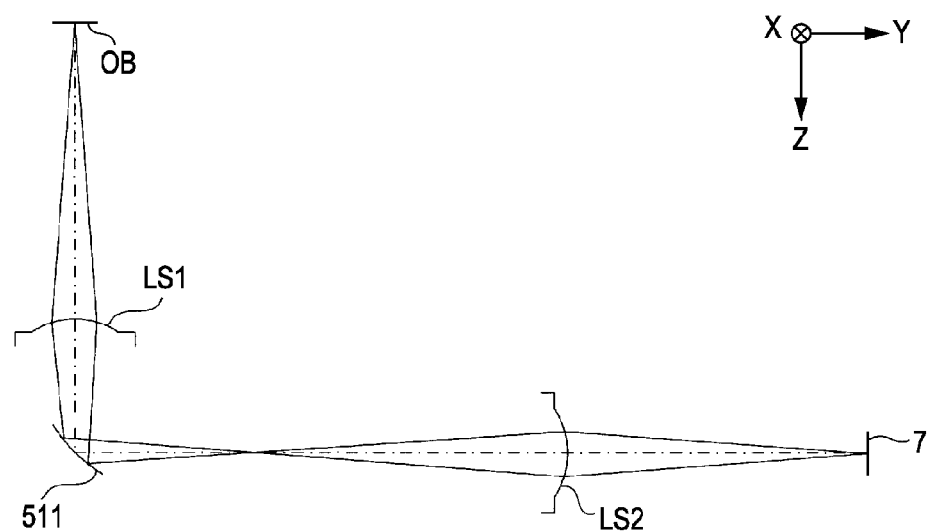
FIG. 3 is a light beam diagram of an imaging optical system including first lenses, a reflective film, and a second reflective film.

The lens array 5 configured in this manner images the light, which is reflected from the document OB at the irradiation position LP of the illumination light, toward the Y-direction (FIG. 3). FIG. 3 shows a light beam diagram of an imaging optical system including the first lenses, the reflective film, and a second reflective film. As shown in FIG. 3, the light that is reflected by the document OB and faces the X-direction is guided to the reflective film 511 by the first lenses LS1. In this manner, it is possible to appropriately guide the light, which faces the Z-direction from the document OB, to the reflective film 511 by the first lenses LS1, such that it is possible to improve utilization efficiency of the light. In addition, the light guided from the document OB to the reflective film 511 is reflected in the Y-direction by the reflective film 511 and then is made to converge in the Y-direction by the second lenses LS2. In this manner, the erect equal-magnification image of the document OB is imaged on a sensor plane of the optical sensor 7 that is located in the Y-direction of the second lenses LS2.

In addition, the plurality of first lenses LS1, the light guiding portion 51 (51a, 51b, and 51c), and the plurality of second lenses LS2 are integrally formed of a transparent medium such as a resin or glass with light transmitting properties with respect to the illumination light. Therefore, the illumination light, which is incident to the first lenses LS1, propagates through the inside of the transparent medium until reaching the second lenses LS2 from the first lenses LS1 through the reflective film 511. That is, air is not present between the first lenses LS1, the reflective film 511, and the second lenses LS2. Therefore, the light is not scattered at an interface with air, and it is possible to improve the utilization efficiency of the light. In addition, when integrally forming the lens array 5, respective portions (for example, the first lenses LS1, the light guiding portion 51, the second lenses LS2) may be formed separately and then may be bonded to be integrated. In addition, the entirety of the lens array 5 may be integrally formed without separately forming respective portions.

The lens array 5 configured in this manner is disposed from the middle of the vertical space SP2a to the middle of the horizontal space SP2b of the second accommodation space SP2. On the other hand, in the horizontal space SP2b, the emission-side aperture member 6 and the optical sensor 7 are disposed in this order in the Y-direction at the right side of the emission portion 51c of the lens array 5. The emission-side aperture member 6 is provided to extend in the X-direction by a length that is substantially equal to the maximum reading range similarly to the incidence-side aperture member 4, and has a plurality of penetration holes 61 that is arranged in a line in the X-direction. The plurality of penetration holes 61 is formed in correspondence with the plurality of the second lenses LS2 in a one-to-one relationship, each of the penetration holes 61 functions as an emission-side aperture of the second lenses LS2. In addition, the optical sensor 7 reads the erect equal-magnification image imaged by the lens array 5 by detecting the light that is emitted from the second lenses LS2 and passes through the emission-side aperture member 6.

In this manner, in the first accommodation space SP1, the light guide 31 and the light source 32 are disposed in a line in the Y-direction, and in the horizontal space SP2c (second accommodation space SP2) under the first accommodation space SP1, the lens array 5 (emission portion 51c thereof) and the optical sensor 7 are disposed in a line in the Y-direction. In addition, at ends of the first accommodation space SP1 and the horizontal space SP2b in the Y-direction, the first accommodation space SP1 and the horizontal space SP2b communicate with each other in the Z-direction. In addition, a printed circuit board 8, which straddles the first accommodation space SP1 and the horizontal space SP2b in the Z-direction, is disposed at this communication portion.

The optical sensor 7 and the light source 32 are mounted on the printed circuit board 8. The light source 32 emits light based on a control signal received from the printed circuit board 8, and the optical sensor 7 transmits and receives a signal related to a read image to and from the printed circuit board 8.

As described above, in this embodiment, the light faces the Z-direction (first direction) from the document OB (object) is reflected in the Y-direction (second direction) intersecting the Z-direction by the reflective film 511 (reflective plane) disposed in the Z-direction of the document OB. That is, the reflective film 511 disposed in the Z-direction of the document OB changes the direction of light from the document OB from the Z-direction to the Y-direction. In addition, the emission portion 51c is disposed in the Y-direction of the reflective film 511, and the emission portion 51c (the second lenses LS2 formed therein) make the light, which is reflected by the reflective film 511, converge toward the Y-direction. In this manner, in the configuration that the light that propagates from the document OB to the reflective film 511 in the Z-direction is made to converge toward the Y-direction by the emission portion 51c, it is possible to provide a space (the first accommodation space SP1) at the document OB side of the emission portion 51c. Therefore, in this embodiment, the light guide 31 (light guiding member) that guides the light from the light source 32 to the document OB (the irradiation position LP to irradiate the document OB with the light) is disposed in this space. Therefore, it is possible to realize miniaturization of the image reading device 1 regardless of the light guide 31 provided other than the light source 32.

In this manner, the light guide 31 is disposed in an empty space at the document OB side of the emission portion 51c of the lens array 5, in other words, the emission portion 51c of the lens array 5 and the light guide 31 are disposed in a line in the Z-direction. Furthermore, in this embodiment, the miniaturization of the image reading device 1 is realized by utilizing an advantage which this disposition has. That is, the lens array 5 images an erect equal-magnification image toward the optical sensor 7, and the light guide 31 guides the light emitted from the light source 32. Therefore, it is necessary to dispose the optical sensor 7 or the light source 32 with respect to each of the lens array 5 and the light guide 31. Contrary to this, in the configuration in which the lens array 5 and the light guide 31 are disposed in a line in the Z-direction, it is possible to collectively dispose both of the optical sensor 7 and the light source 32 in the Y-direction of the lens array 5 and the light guide 31. Therefore, in this embodiment, the optical sensor 7 and the light source 32 are disposed in the Y-direction of the lens array 5 and the light guide 31. In addition, the printed circuit board 8 is disposed in the Y-direction of the lens array 5 and the light guide 31, and the optical sensor 7 and the light source 32 are mounted on the same printed circuit board 8. As a result, it is possible to realize the miniaturization of the image reading device 1.

As described above, in the embodiment, the Z-direction corresponds to "first direction" of the invention, and the Y-direction corresponds to "second direction" of the invention. In addition, the image reading device 1 corresponds to "image reading device" of the invention, the light source 32 corresponds to "light source" of the invention, the light guide 31 corresponds to "light guiding member" of the invention, the first lenses LS1, the reflective film 511, and the second lenses LS2 correspond to "imaging optical system" of the invention, the optical sensor 7 corresponds to "optical sensor" of the invention, and the printed circuit board 8 corresponds to "substrate" of the invention. In addition, the incidence portion 51a corresponds to "incidence portion" of the invention, the bent portion 51b corresponds to "connection portion" of the invention, the emission portion 51c corresponds to "emission portion" of the invention, and the reflective film 511 corresponds to "reflective plane" of the invention. In addition, the first lenses LS1 correspond to "incidence lenses" of the invention, and the second lenses LS2 correspond to "emission lenses" of the invention.

Figure 4:
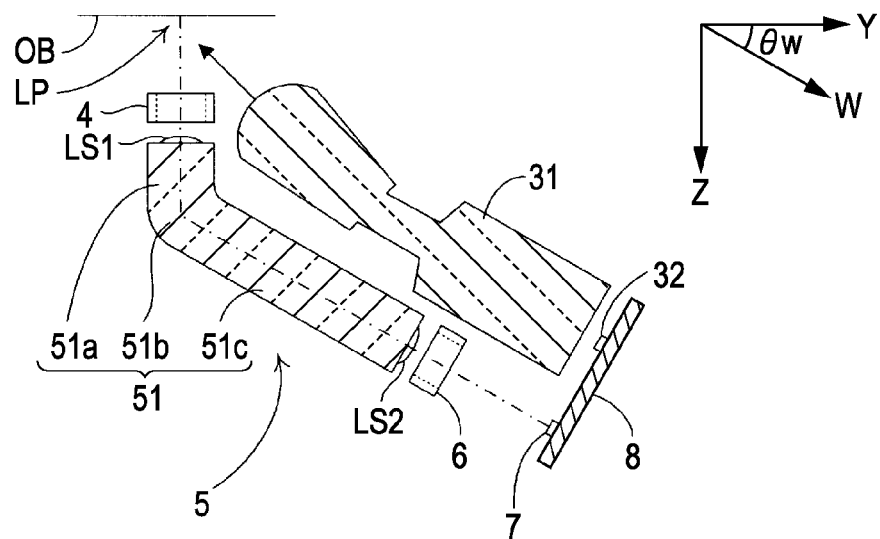
FIG. 4 is a schematic diagram illustrating a modification of the imaging optical system.

In addition, the present invention is not limited to the above-described embodiment, and various modifications may be made without departing from the scope of the invention in addition to the above-described configurations. For example, in the above-described embodiment, the light guiding portion 51 has a shape that is bent at a right angle from the Z-direction to the Y-direction in the bent portion 51b (that is, the Y-direction corresponds to "second direction" of the invention). However, the bent angle of the light guiding portion 51 is not limited to 90°, and for example, may be configured as shown in FIG. 4. FIG. 4 shows a schematic diagram illustrating a modification of the imaging optical system. The modification shown in FIG. 4 is different from the embodiment only in the imaging optical system, such that the different point will be described here, and corresponding reference numerals will be given to common portions, and description thereof will be appropriately omitted. In addition, it is needless to say that the modification in FIG. 4 has the same effect by the configuration common with the above-described embodiment.

In a lens array 5 shown in FIG. 4, a bent portion 51b of a light guiding portion 51 is bent in a W-direction (second direction) intersecting the Z-direction at an angle θw (<90°) smaller than 90°, and an emission portion 51c continuing from the bent portion 51b has a shape extending in the W-direction. That is, the light guiding portion 51 is bent from the X-direction to the W-direction at the bent portion 51b that extends from an incidence portion 51a to an emission portion 51c. On an upper surface of the incidence portion 51a of the light guiding portion 51, the plurality of first lenses, which is upwardly convex, is arranged in a line in the X-direction at a predetermined pitch. In addition, on an end face of the emission portion 51c of the light guiding portion 51 in the W-direction, a plurality of second lenses, which is convex in the W-direction, is arranged in the X-direction at a predetermined pitch. In addition, the outer peripheral surface of the bent portion 51b is finished to have a shape satisfying a total reflection condition.

Since the lens array 5 has such a configuration, the light incident from the first lenses LS1 is totally reflected on an outer peripheral surface of the bent portion 51b in the W-direction, and is guided to the second lenses LS2. The second lenses LS2 make the light, which is totally reflected on the bent portion 51b, converge in the W-direction. In this manner, an erect equal-magnification image of document OB is imaged in the W-direction of the second lenses LS2. This erect equal-magnification image is read by the optical sensor 7 that is disposed in the W-direction of the second lenses LS2.

On the other hand, the light guide 31 is disposed at an upper side of the lens array 5, and the light source 32 is disposed in the W-direction of the light guide 31. The light emitted from the light source 32 is guided by the light guide 31 and is emitted to the irradiation position LP. In this manner, in the modification shown in FIG. 4, when it is configured to make the light, which propagates from the document OB to the outer peripheral surface (reflective plane) of the bent portion 51b in the Z-direction, converge in the W-direction by the light emission portion 51c, a space is provided at a document OB side of the light emission portion 51c. The light guide 31 (light guiding member) that guides the light from the light source 32 to the document OB (the irradiation position LP to irradiate the document OB with the light) is disposed in this space. Therefore, it is possible to realize miniaturization of the image reading device 1 regardless of the light guide 31 provided other than the light source 32.

In addition, in the modification shown in FIG. 4, both of the optical sensor 7 and the light source 32 are collectively disposed in the W-direction of the lens array 5 and the light guide 31, and the optical sensor 7 and the light source 32 are mounted on the same printed circuit board 8 that is disposed in the W-direction of the lens array 5 and the light guide 31. As a result, it is also possible to realize the miniaturization of the image reading device 1.

In addition, in the above-described embodiment, the surface of the reflective film 511 has a bent shape. However, for example, the outer peripheral surface of the bent portion 51b of the light guiding portion 51 may be finished to have a flat surface shape, and the reflective film 511 may be formed on this flat surface. Therefore, the reflective film 511 may be formed to have a flat surface shape.

In addition, a method of forming the reflective film 511 may appropriately adopt a method other than the above-described metal vapor-deposition.

In addition, with respect to the shape of the above-described first and second lenses LS1 and LS2, various shapes such as a non-spherical shape or a free form surface may be adopted.

Figure 5:
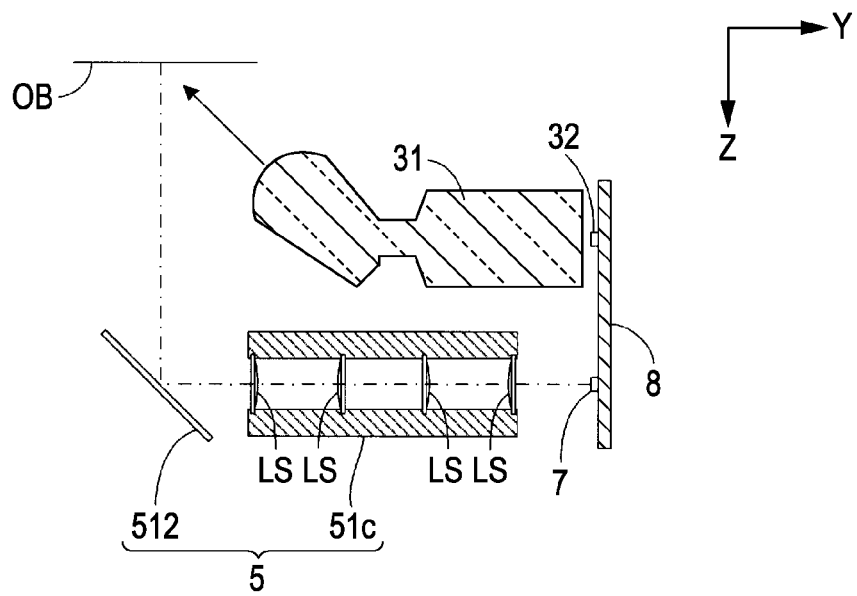
FIG. 5 is a schematic diagram illustrating another modification of the imaging optical system.

In addition, in the above-described embodiment, the first lenses LS1, the reflective film 511, and the second lenses LS2, which are formed of a transparent medium, are used as the imaging optical system. However, as shown in FIG. 5, the imaging optical system may be modified. Here, FIG. 5 shows a schematic diagram illustrating another modification of the imaging optical system. The modification shown in FIG. 5 is different from the embodiment only in the imaging optical system, such that the different point will be described here, and corresponding reference numerals will be given to common portions, and description thereof will be appropriately omitted. In addition, it is needless to say that the modification in FIG. 5 has the same effect by the configuration common with the above-described embodiment.

In the modification shown in FIG. 5, an emission portion 51c (emission portion) is made up by four sheets of lenses LS that are arranged in a line in the Y-direction. In addition, a reflective mirror 512 that is configured separately from the emission portion 51c is disposed in the Z-direction of the document OB. Light that faces the Z-direction from the document OB is directly incident to the reflective mirror 512, and is reflected toward the Y-direction by the reflective mirror 512. In addition, the four sheets of mirrors LS making up the emission portion 51c cooperate with each other, and thereby make the light, which is reflected by the reflective mirror 512, converge toward the Y-direction. In this manner, the erect equal-magnification image is imaged on the optical sensor 7. In addition, it may be modified to realize the same function by using a refraction index distribution lens instead of four sheets of lenses LS shown in FIG. 5.

What is claimed is:

1. A surface reading device for reading an image on a target-surface, comprising:
    a light source adjacent an optical sensor;
    a separator structure bisecting a space between the light source and optical sensor to isolate the light source from the optical sensor, the separator structure having a first surface defining a first side, and having a second surface defining a second side, said second side being opposite said first side, the light source being on the first side and the optical sensor being on the second side;
    a first light guide on the first side of the separator structure, the first light guide having a first light-incident end facing the light source, a first light-emission end angled toward the target surface to emit light toward the target surface at an acute angle relative to the target surface, and a first light-channel to convey light from its first light-incident end to its first light-emission end;
    a first aperture facing the target surface and positioned to receive reflected light emitted from the first light-emission end of the first light guide and reflected from the target surface, the first aperture passing the reflected light from the first side of the separator structure to the second side of the separator structure;
    a second light guide on the second side of the separator structure, the second light guide having a second light-incident end facing the first aperture to receive the reflected light passed by the first aperture, a second light-emission end facing the optical sensor, and a second light-channel to convey light from its second light-incident end to its second light-emission end, wherein the second light guide provides the optical sensor an erect image of the image on the target-surface.

2. The surface reading device of claim 1, wherein the light source and optical sensor are coplanar.

3. The surface reading device of claim 2, wherein light source and optical sensor are on a common printed circuit substrate.

4. The surface reading device of claim 1, wherein said separator structure separates and optically isolates the first light guide from the second light guide.

5. The surface reading device of claim 1, wherein the first light guide is immediately adjacent the first surface of the separator structure, and the second light guide is immediately adjacent the second surface of the separator structure.

6. The surface reading device of claim 5, wherein the first light guide is on the first surface of the separator structure.

7. The surface reading device of claim 5, wherein said first light guide and said second light guide are coplanar.

8. The surface reading device of claim 7, wherein the plane defined by the first light guide and second light guide intersects at a right angle the first surface of the separator structure.

9. The surface reading device of claim 1, wherein said second light guide has an incident-lens on it's second incident-light end, said incident-lens being convex toward the first aperture, and has an emission-lens on its light-emission end, said emission-lens being convex toward the optical sensor.

10. The surface reading device of claim 9, wherein:
    the second light guide has a bend so that the incident-lens has a common central axis with the central axis of a hole-open of the first aperture, and the emission-lens has a common central axis with a central axis of the optical sensor.

11. The surface reading device of claim 10, wherein outer perimeter of the bend of the second light guide has a reflective coating to reflect light from the incident-lens toward the emission-lens.

12. The surface reading device of claim 9, further having a second aperture between the emission-lens of the second light guide and the optical sensor to pass light from the emission-lens to the optical sensor.

13. The surface reading device of claim 9, wherein the incident-lens, the emission-lens and the second light guide are integrally formed of a transparent medium.

14. The surface reading device of claim 1, wherein said first light guide and said second light guide are each made of a transparent medium.

15. The surface reading device of claim 1, wherein said target-surface is a platen on which a document to be imaged is placed.

16. A surface reading device for reading an image on a target-surface, comprising:
- a light source coplanar with an optical sensor, said light source and optical sensor being on a common printed circuit substrate;
- a first light-path guiding mechanism that guides light from the light source to the target surface;
- a second light-path guiding mechanism that guides reflected light from the target surface to the optical sensor, and provides the optical sensor an erect image of the image on the target-surface.

17. The surface reading device of claim 16, wherein the second light-path guiding mechanism includes:
- a single reflector that redirects the reflected light from the target surface directly toward the optical sensor.

18. The surface reading device of claim 17, wherein the second light-path guiding mechanism includes a series of lenses in the optical path from the single reflector to the optical sensor, said series of lenses converging the light toward the optical sensor and providing the erect image of the image on the target-surface.

19. The surface reading device of claim 17, wherein said series of lenses are four lenses.

20. The surface reading device of claim 17, wherein the second-light guiding mechanism includes a refraction index distribution lens in the optical path from the single reflector to optical sensor, said refraction index distribution lens providing the erect image of the image on the target-surface.

* * * * *